United States Patent
Choi et al.

(10) Patent No.: US 10,684,383 B2
(45) Date of Patent: Jun. 16, 2020

(54) SEISMIC MOTION SENSOR AND EARTHQUAKE RESPONSE SYSTEM USING THE SAME

(71) Applicant: NATIONAL DISASTER MANAGEMENT RESEARCH INSTITUTE, Ulsan (KR)

(72) Inventors: Seon Hwa Choi, Ulsan (KR); Kihwan Lim, Ulsan (KR); Myoung Jin Lee, Ulsan (KR); Jae Seon Kim, Ulsan (KR); Hyeong Gu Kang, Ulsan (KR); Keumho Oh, Goyang-si (KR); Young-woo Kwon, Daegu (KR)

(73) Assignee: NATIONAL DISASTER MANAGEMENT RESEARCH INSTITUTE, Ulsan (KR)

(*) Notice: Subject to any disclaimer, the term of this patent is extended or adjusted under 35 U.S.C. 154(b) by 0 days.

(21) Appl. No.: 16/695,964

(22) Filed: Nov. 26, 2019

(65) Prior Publication Data

US 2020/0096657 A1 Mar. 26, 2020

Related U.S. Application Data (63) Continuation of application No. PCT/KR2019/007531, filed on Jun. 21, 2019.

(30) Foreign Application Priority Data

Sep. 7, 2018 (KR) .................. 10-2018-0106912

(51) Int. Cl.
*G01V 1/00* (2006.01)
*G06N 3/02* (2006.01)
(Continued)

(52) U.S. Cl.
CPC .............. *G01V 1/008* (2013.01); *G06N 3/02* (2013.01); *G01V 1/28* (2013.01);
(Continued)

(58) Field of Classification Search
None
See application file for complete search history.

(56) References Cited

U.S. PATENT DOCUMENTS

| | | | |
|---|---|---|---|
| 2008/0111705 A1* | 5/2008 | Lee | G08B 27/008 340/690 |
| 2016/0203697 A1* | 7/2016 | Lu | G08B 21/10 340/690 |
| 2017/0003406 A1* | 1/2017 | Ueda | G01V 1/162 |

FOREIGN PATENT DOCUMENTS

JP 05340799 12/1993
JP 10090427 A * 4/1998
(Continued)

OTHER PUBLICATIONS

Wang et al., "Artificial Neural Network-Based Seismic Detector" Bulletin of the Seismological Society of America, vol. 85, No. 1, pp. 308-319, Feb. 1995 (Year: 1995).*

*Primary Examiner* — John C Kuan
(74) *Attorney, Agent, or Firm* — Cantor Colburn LLP (57) ABSTRACT

Provided is an earthquake response system using a seismic motion sensor. The seismic motion sensor of the earthquake response system includes: a sensor unit measuring a sensor value including peak ground acceleration (PGA) of the ground due to shaking; a seismic motion sensing unit sensing seismic motion on the basis of a seismic motion sensing result value calculated from an artificial neural network that uses the peak ground acceleration as input when the peak ground acceleration satisfies a seismic motion sensing condition; a seismic motion determiner determining generation of final seismic motion on the basis of a seismic
(Continued)

motion determination parameter calculated from the sensor value on the basis of the seismic motion sensing result; a shaking grade calculator calculating a shaking grade of the determined final seismic motion through the peak ground acceleration; and a communication unit notifying the shaking grade of the final seismic motion.

8 Claims, 4 Drawing Sheets (51) Int. Cl.
    *G08B 21/10*     (2006.01)
    *G01V 1/28*     (2006.01)
    *G06N 3/08*     (2006.01)

(52) U.S. Cl.
    CPC ........ *G01V 2210/1232* (2013.01); *G06N 3/08* (2013.01); *G08B 21/10* (2013.01)

(56) References Cited

FOREIGN PATENT DOCUMENTS

| | | |
|---|---|---|
| JP | 3047426 | 5/2000 |
| JP | 2009150817 | 7/2009 |
| JP | 2010151628 | 7/2010 |
| KR | 100911896 | 8/2009 |
| KR | 20140037468 A * | 3/2014 |
| KR | 20150035633 | 4/2015 |
| KR | 101872238 B1 * | 7/2018 |

* cited by examiner

SEISMIC MOTION SENSOR AND EARTHQUAKE RESPONSE SYSTEM USING THE SAME

TECHNICAL FIELD

The present invention relates to a seismic motion sensor, an earthquake response system using the seismic motion sensor, and a method of sensing seismic motion using the seismic motion sensor.

BACKGROUND ART

Seismic motion is a phenomenon in which waves, that is, seismic waves due to a shock generated by rapid diastrophism in the earth reach the surface of the earth and shake the ground, and scientifically, it may be defined as "shaking of the earth due to seismic waves traveling from an elastic energy source". The magnitude of seismic motion is various from seismic motion with a very small magnitude that is detected only by a sensitive seismograph to large-scaled seismic motion that causes great damage to a huge area. There are thousands of seismic motions that are generated everyday all over the world in the earth and most seismic motion is generated by great power inside the earth that has acted on continental drift, submarine expansion, formation of mountain ranges for a long period of time.

When seismic motion is generated, not only structures including industrial facilities are damaged, but also loss of life may accompany. The degree of damage due to seismic motion may depend on the magnitude of the seismic motion and the distance from the location where the earthquake has been generated (the seismic center). This is because seismic motion shows a characteristic that the longer the distance from the location where the seismic motion is generated, the more the energy of the seismic motion attenuates and weakens. Accordingly, when seismic motion is generated, it is very important to accurately determine the seismic motion, find out the magnitude of the generated seismic motion, and quickly give warning of generation the seismic motion in terms of preparing against earthquake damage over a huge area and loss of life.

On the other hand, seismic motion sensors for sensing seismic motion are expensive products, are large in size, and require high technology, so they are installed and fixed at designated places or institutions. Further, it is a general system to analyze information collected from the sensors and one-sidedly inform the result of sensing seismic motion to the people. Further, the information or countermeasures that are provided to the people after seismic motion is sensed are simple warning of generation of the seismic motion or standardized information, so the usability of an alarm is low. Therefore, there is a need for a common type of seismic motion sensor that is installed at facilities, etc. that the people usually live around and can access, and can quickly sense seismic motion and automatically control corresponding risk factors. Further, it would be required to popularize an earthquake response system that can provide countermeasures that are varied on the basis of the current location, situation, etc. of a user after sensing seismic motion.

A technology of the background of the present invention has been disclosed in Korean Patent Application Publication No. 10-0911896.

DISCLOSURE

Technical Problem

The present invention has been made in an effort to solve the problems in the related art and an object of the present invention is to provide a seismic motion sensor that can sense seismic motion through an artificial neural network and can determine and then notify certainty of the sensed seismic motion, a method of sensing seismic motion using the seismic motion sensor, and an earthquake response system using the seismic motion sensor.

The present invention has been made in an effort to solve the problems in the related art and an object of the present invention is to provide a seismic motion sensor that can output an optimized alarm according to the grade of seismic motion and the characteristics of a facility where a user is located, and can automatically take measures in cooperation with an Internet of things (IOT) device when an earthquake occurs, a method of sensing seismic motion using the seismic motion sensor, and an earthquake response system using the seismic motion sensor.

However, the objects to be achieved by embodiments of the present invention are not limited to the objects described above and there may be other objects.

Technical Solution

As a technical means for achieving the objects, a method of sensing seismic motion using a seismic motion sensor according to an embodiment of the present invention may include: measuring a sensor value including peak ground acceleration (PGA) of the ground due to shaking from the seismic motion sensor; sensing seismic motion on the basis of a seismic motion sensing result value calculated from an artificial neural network that uses the peak ground acceleration as input when the peak ground acceleration satisfies a seismic motion sensing condition; determining generation of final seismic motion on the basis of a seismic motion determination parameter calculated from the sensor value on the basis of the seismic motion sensing result; calculating a shaking grade of the determined final seismic motion through the peak ground acceleration; and notifying the shaking grade of the final seismic motion.

The sensor value may include an X-axial sensor value, a Y-axial sensor value, and a Z-axial sensor value, and the seismic motion sensing condition may determine whether the peak ground acceleration exceeds predetermined critical acceleration.

According to an embodiment of the present invention, the sensing of seismic motion may include: calculating the seismic motion sensing result value from the artificial neural network in consideration of the seismic motion characteristic parameter; and sensing shaking when the seismic motion sensing result value exceeds a predetermined critical sensing value as seismic motion, and the seismic motion characteristic parameter may include at least one of a ZC (Zero Cross), an IQR (Interquartile range), and a CAV (Cumulative Absolute Velocity).

According to an embodiment of the present invention, the sensing of seismic motion may include: determining whether the seismic motion sensing result value exceeds the predetermined critical sensing value; and determining whether the seismic motion sensing result value exceeds the predetermined critical sensing value for a predetermined first delay time when the seismic motion sensing result value does not exceed the predetermined critical sensing value.

According to an embodiment of the present invention, when the seismic motion sensing result value exceeds a predetermined critical sensing value and seismic motion is sensed, the determining of generation of final seismic motion may determine generation of final seismic motion on the basis of whether the seismic motion determination parameter exceeds a critical determination value set for each seismic motion determination parameter for a predetermined time, and the seismic motion determination parameter may include at least one of the seismic motion sensing result value, an STA (Short Term Average), and an LTA (Long Term Average).

According to an embodiment of the present invention, the determining of generation of final seismic motion may determine generation of final seismic motion when the seismic motion sensing result value exceeds the critical determination value by a predetermined number of times for the predetermined time, or may determine generation of final seismic motion when the seismic motion sensing result value exceeds the critical determination value for the predetermined time and the STA and the LTA exceed the critical determination value over the predetermined number of times.

According to an embodiment of the present invention, the calculating of a shaking grade of final seismic motion may calculate a shaking grade of the final seismic motion on the basis of a shaking grade determination period to which peak ground acceleration associated with shaking determined as the final seismic motion pertains, and may detect a change of the shaking grade of the final seismic motion according to a change of the peak ground acceleration for a predetermined second delay time.

According to an embodiment of the present invention, the notifying of the shaking grade of the final seismic motion may set different alarms on the basis of at least any one of the calculated shaking grade of the final seismic motion and a characteristic of a facility where a user terminal is located.

A seismic motion sensor according to an embodiment of the present invention may include: a sensor unit measuring a sensor value including peak ground acceleration (PGA) of the ground due to shaking; a seismic motion sensing unit sensing seismic motion on the basis of a seismic motion sensing result value calculated from an artificial neural network that uses the peak ground acceleration as input when the peak ground acceleration satisfies a seismic motion sensing condition; a seismic motion determiner determining generation of final seismic motion on the basis of a seismic motion determination parameter calculated from the sensor value on the basis of the seismic motion sensing result; a shaking grade calculator calculating a shaking grade of the determined final seismic motion through the peak ground acceleration; and a communication unit notifying the shaking grade of the final seismic motion.

An earthquake response system according to an embodiment of the present invention may include: a seismic motion sensor measuring a sensor value including peak ground acceleration (PGA) of the ground due to shaking from the seismic motion sensor, sensing seismic motion on the basis of a seismic motion sensing result value calculated from an artificial neural network that uses the peak ground acceleration as input when the peak ground acceleration satisfies a first seismic motion sensing condition, determining generation of final seismic motion on the basis of a seismic motion determination parameter calculated from the sensor value on the basis of the seismic motion sensing result, calculating a shaking grade of the determined final seismic motion through the peak ground acceleration, and notifying the shaking grade of the final seismic motion; and a user terminal outputting different alarms set on the basis of at least one of the calculated shaking grade of the final seismic motion and a characteristic of a facility where the user terminal is located.

The aspects are only examples and should not be construed as intending to limit the present invention. Additional embodiments to the drawings and the detailed description may exist other than the exemplary embodiments described above.

Advantageous Effects

According to the present invention described above, it is possible to provide an earthquake response system using a seismic motion sensor, the system being able to sense seismic motion through an artificial neural network and determine and then notify certainty of the sensed seismic motion.

The present invention has been made in an effort to solve the problems in the related art described above and can provide an earthquake response system using a seismic motion sensor, the system being able to output an optimal alarm according to the grade of seismic motion and the characteristic of a facility where a user is located, and automatically take measures in cooperation with an IOT device when an earthquake occurs.

BEST MODE

Embodiments of the present invention are described hereafter with reference to the accompanying drawings for those skilled in the art to be able to easily achieve the present invention. However, the present invention may be achieved in various different ways and is not limited to the embodiments described herein. Further, in the accompanying drawings, components irrelevant to the description will be omitted in order to obviously describe the present invention, and similar reference numerals will be used to describe similar components throughout the specification.

Further, when an element is referred to as being "connected with" another element throughout the specification, it may be "directly connected" to the other element and may also be "electrically connected" to the other element with another element intervening therebetween.

Throughout the specification, when a member is disposed "on", "at the upper portion" "at the upper end", "under", "at the lower portion", and "at the lower end", it may be disposed not only in contact with another member, but with another member between the two members.

Throughout the specification, unless explicitly described otherwise, "comprising" any components will be understood to imply the inclusion of other components rather than the exclusion of any other components.

Figure 1:
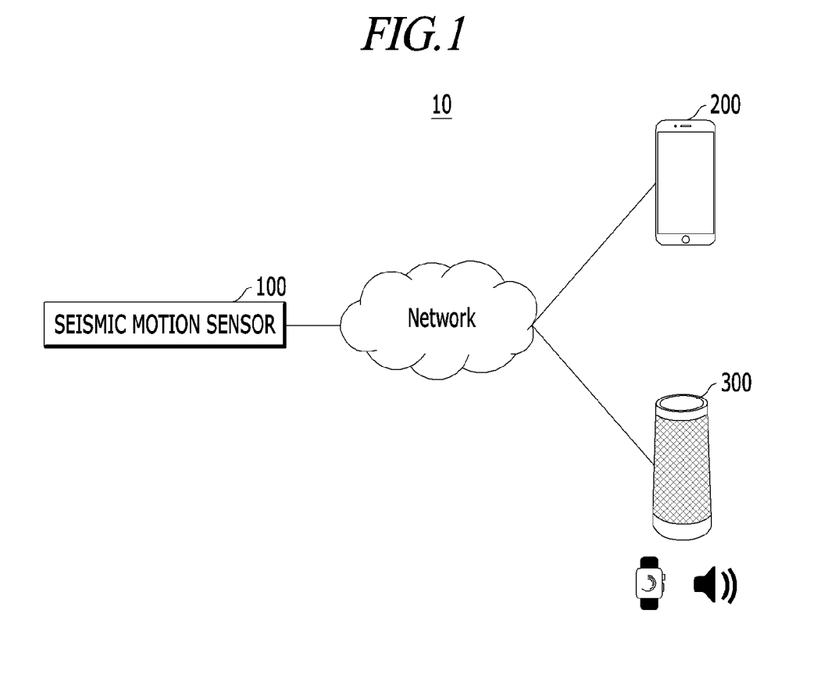
FIG. 1 is a diagram showing the configuration of an earthquake response system using a seismic motion sensor according to an embodiment of the present invention.

FIG. 1 is a diagram showing the configuration of an earthquake response system using a seismic motion sensor according to an embodiment of the present invention.

Referring to FIG. 1, an earthquake response system 10 using a seismic motion sensor may include a seismic motion sensor 100, a user terminal 200, and an IOT device 300. The seismic motion sensor 100 is a common type of seismic motion sensor and may be installed as a plurality of pieces at life facilities of users such as home, a school, and an office. The seismic motion sensor 100 may be provided on the basis of a MEMS (Micro Electro-Mechanical Systems) sensor and Arduino. Arduino can control electronic devices such as a sensor, a motor, and various modules by receiving input values from various switches and sensors and using coded programs. The seismic motion sensor 100 based on MEMS and Arduino can be achieved at a low cost, so it can be popularized to the public and provided as a countermeasure for sensing seismic motion.

The seismic motion sensor 100, the user terminal 200, and the IOT device 300 may be connected to one another through a network. The network means a connection structure enabling information exchange among nodes such as terminals and servers. For example, the network may include a 3GPP (3rd Generation Partnership Project) network, an LTE (Long Term Evolution) network, a 5G network, a WIMAX (World Interoperability for Microwave Access) network, the internet, a LAN (Local Area Network), a Wireless LAN (Wireless Local Area Network), a WAN (Wide Area Network), a PAN (Personal Area Network), a WiFi network, a Bluetooth network, a satellite broadcasting network, an analogue broadcasting network, a DMB (Digital Multimedia Broadcasting) network, etc., but is not necessarily limited thereto.

The user terminal 200 can receive and output an alarm according to seismic motion shaking from the seismic motion sensor 100. The user terminal 200, for example, may include: a smartphone, a smartpad, a tablet PC, etc.; all kinds of wireless communication devices such as PCS (Personal Communication System), GSM (Global System for Mobile communication), PDC (Personal Digital Cellular), PHS (Personal Handyphone System), PDA (Personal Digital Assistant), IMT (International Mobile Telecommunication)-2000, CDMA (Code Division Multiple Access)-2000, W-CDMA (W-Code Division Multiple Access), and Wibro (Wireless Broadband Internet) terminals; and wire communication devices such as a desktop computer and a smart TV.

The IOT device 300 can output an alarm according to seismic motion shaking received from the seismic motion sensor 100, or the operation of the IOT device 300 can be controlled in response to a control signal generated on the basis of a shaking grade of final seismic motion received from the seismic motion sensor 100. For example, the IOT device 300 may include various media and devices such as an artificial intelligence speaker, a smartwatch, a circuit breaker, a gas circuit breaker, an LED lamp module, a door lock, a furniture lock, but is not limited thereto. The shaking grade of final seismic motion, the user terminal 200, and the IOT device 300 will be described below.

Figure 2:
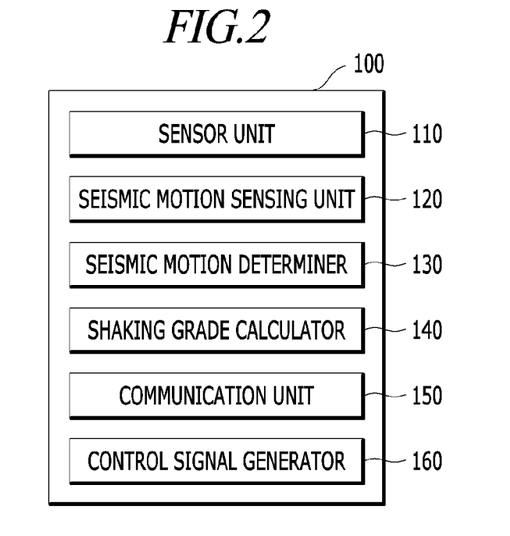
FIG. 2 is a diagram showing the configuration of a seismic motion sensor according to an embodiment of the present invention.

FIG. 2 is a diagram showing the configuration of a seismic motion sensor according to an embodiment of the present invention.

Referring to FIG. 2, the seismic motion sensor 100 may include a sensor unit 110, a seismic motion sensing unit 120, a seismic motion determiner 130, a shaking grade calculator 140, a communication unit 150, and a control signal generator 160. The sensor unit 110 can measure a sensor value including peak ground acceleration (PGA) of the ground due to shaking. The peak ground acceleration, which is peak ground acceleration that is generated by an earthquake, may be defined as the product of an acceleration coefficient and the acceleration of gravity. The sensor unit 110 may include an X-axial sensor, a Y-axial sensor, and a Z-axial sensor that measure a change in acceleration on the X-axis, the Y-axis, and Z-axis due to shaking, respectively. That is, the sensor value may include an X-axial sensor value, a Y-axial sensor value, and a Z-axial sensor value associated with the peak ground acceleration.

The seismic motion sensing unit 120 can determine whether the peak ground acceleration satisfies a seismic motion sensing condition. The seismic motion sensing condition may determine whether the peak ground acceleration exceeds predetermined critical acceleration. The seismic motion sensor 100 may be provided as a fixed type (under an environment with relatively less motion in ordinary times), so the seismic motion sensor 100 can be used without the peak ground acceleration value regulated, unlike a moving type of seismic motion sensing device in the related art. Further, the predetermined critical acceleration, for example, may be 0.2 ga, but is not limited thereto and may be automatically set as a value between 0.1 and 0.2 on the basis of noise information in accordance with the operation environment of the seismic motion sensor 100.

Further, the seismic motion sensing unit 120 performs a seismic motion sensing step when the peak ground acceleration satisfies the seismic motion sensing condition. When the peak ground acceleration satisfies the seismic motion sensing condition, the seismic motion sensing unit 120 can sense seismic motion on the basis of a seismic motion sensing result value (ANN result value) calculated from an artificial neural network (ANN) that uses the peak ground acceleration as input. The artificial neural network can be constructed through learning that uses the peak ground acceleration value as input and discriminates shaking due to seismic motion and shaking due to causes other than seismic motion on the basis of the peak ground acceleration value. For example, the artificial neural network can discriminate shaking due to seismic motion and shaking due to causes other than seismic motion by classifying and learning a first acceleration type model including the X-axial component, the Y-axial component, and the Z-axial component of the peak ground acceleration due to seismic motion and a second acceleration type model including the X-axial component, the Y-axial component, and the Z-axial component of the peak ground acceleration due to various types of shaking other than seismic motion, and by classifying and learning the types of seismic motion characteristic parameters (to be described below) calculated from the first acceleration type model and the second acceleration type model.

The seismic motion sensing unit 120 can calculate a seismic motion sensing result in consideration of the seismic motion characteristic parameters to calculate a more reliable result through the artificial neural network. For example, the artificial neural network may be a deep learning neural network, but is not limited thereto and various neural network systems that have been developed already or will be developed in the future can be applied.

Figure 3:
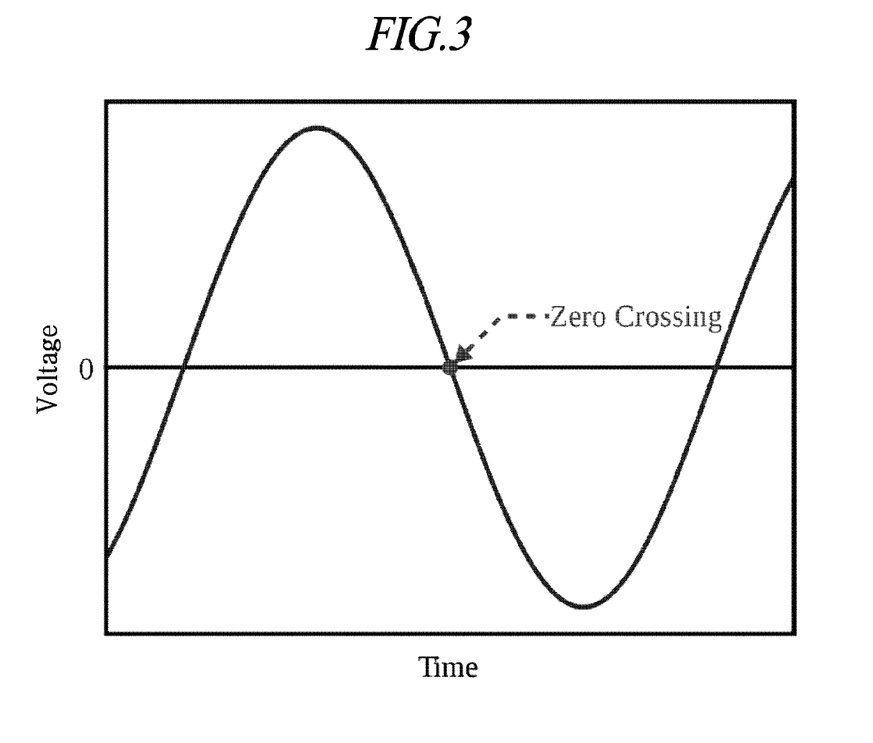
FIG. 3 is a diagram showing an example of seismic motion characteristic parameters of the seismic motion sensor according to an embodiment of the present invention.
Figure 4:
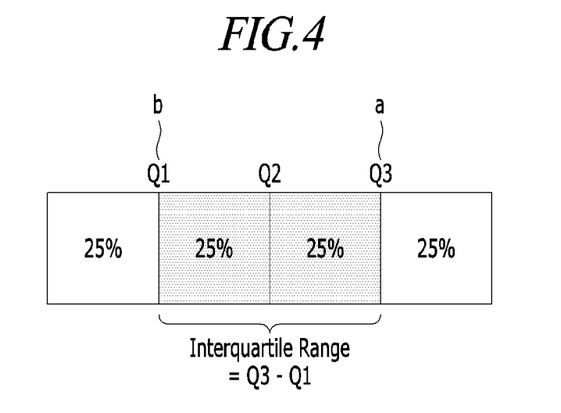
FIG. 4 is a diagram showing another example of seismic motion characteristic parameters of the seismic motion sensor according to an embodiment of the present invention.

FIG. 3 is a diagram showing an example of seismic motion characteristic parameters of the seismic motion sensor according to an embodiment of the present invention and FIG. 4 is a diagram showing another example of seismic motion characteristic parameters of the seismic motion sensor according to an embodiment of the present invention.

The seismic motion characteristic parameters that the seismic motion sensing unit 120 considers may include at least one of a ZC (Zero Cross), an IQR (Interquartile range), and a CAV (Cumulative Absolute Velocity). The ZC, IQR, and CAV that are seismic motion characteristic parameters may be characteristics that are used to extract components close to seismic motion from the peak ground acceleration. Referring to FIG. 3, the ZC of the seismic motion characteristic parameters may mean taking a maximum value of the numbers of times over 0 on the X-, Y-, and Z-axes using an X-axial sensor value, a Y-axial sensor value, and a Z-axial sensor value related to the peak ground acceleration. Further, referring to FIG. 4, the IQR, which is a kind of variability, means a range except for ¼ at both ends of zonation. That is, it is possible to calculate the degree of variability from the distance between two points having the same percentage from the left and right of a center value positioned at the center of distribution. The IQR may be calculated as the difference between Q3(a) that is upper 25% and Q1(b) that is lower 25% in the vector sum of X, Y, and Z of the peak ground acceleration. In other words, IQR may be calculated as a variation of 50% at the middle of vector sum of an aligned acceleration axis. Further, the CAV is a time integration value (e.g., 2 seconds) of the vector sum of X, Y, and Z of the peak ground acceleration and can be calculated from the following Formula 1.

$$CAV = \int_0^2 |a(t)| dt \qquad \text{[Formula 1]}$$

Figure 5:
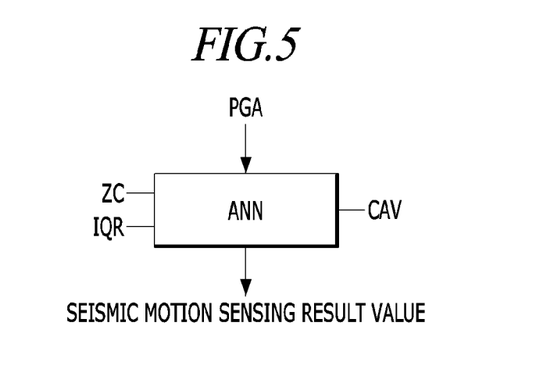
FIG. 5 is a schematic diagram showing the operation of a seismic motion sensing unit of the seismic motion sensor according to an embodiment of the present invention.

FIG. 5 is a schematic diagram showing the operation of a seismic motion sensing unit of the seismic motion sensor according to an embodiment of the present invention.

Referring to FIG. 5, the seismic motion sensing unit 120 uses the peak ground acceleration as input, calculates the ZC, IQR, and CAV that are seismic motion characteristic parameters, and calculates a seismic motion sensing result value through an artificial neural network considering at least any one of the ZC, IQR, and CAV that are seismic motion characteristic parameters, thereby being able to calculate a reliable seismic motion sensing result value. For example, the seismic motion sensing unit 120 can calculate a seismic motion sensing result value through a predetermined equation having the arithmetic mean of the seismic motion characteristic parameter values (a ZC, an IQR, and a CAV) or the seismic motion characteristic parameter values as variables. Further, learning of calculation of a seismic motion sensing result value according to input peak ground acceleration may be repeated, and accordingly, an artificial neural network that is the base of seismic motion sensing according to calculation of seismic motion sensing result value by the seismic motion sensing unit 120 can be continuously updated. The reliable seismic motion sensing result value may mean a result of more accurately discriminating shaking due to seismic motion and shaking due to causes other than seismic motion.

Seismic motion sensing according to calculation of seismic motion sensing result value (ANN result value) is described in detail. The seismic motion sensing unit 120 can determine whether a seismic motion sensing result value exceeds a predetermined critical sensing value. For example, the critical sensing value may be 0.9. When a seismic motion sensing result value exceeds a predetermined critical sensing value, the seismic motion sensing unit 120 can sense that the shaking was generated by seismic motion. In other words, it is possible to discriminate shaking due to factors other than seismic motion and shaking due to seismic motion from a seismic motion sensing result value, and when the seismic motion sensing result value exceeds a critical sensing value, it is possible to sense that seismic motion was generated.

Further, when the seismic motion sensing result value does not exceed the predetermined critical sensing value, the seismic motion sensing unit 120 continuously updates the seismic motion sensing result value and can determine whether the seismic motion sensing result value exceeds the predetermined critical sensing value for a predetermined first delay time. For example, the first delay time may be 10 seconds. The seismic motion sensing unit 120 can determine whether a seismic motion sensing result value exceeds the critical sensing value due to a change of shaking (e.g., when the intensity of shaking increases) for the first delay time in consideration of the change of shaking even if the seismic motion sensing result value initially calculated after the shaking is generated does not exceed the critical sensing value. The seismic motion sensing unit 120 can prevent omission of sensing of seismic motion by considering a change of shaking for the first delay time.

When seismic motion is sensed by the seismic motion sensing unit 120, the seismic motion determiner 130 can determine generation of final seismic motion on the basis of seismic motion determination parameters calculated from sensor values on the basis of the sensing result of the seismic motion. The seismic motion determination parameters may include at least any one of a seismic motion sensing result value (ANN result value), an STA (Short Term Average), and an LTA (Long Term Average). The STA means the short-period average of the X-axial sensor value, the Y-axial sensor value, and the Z-axial sensor value of the sensor values and the LTA means a long-period average of the X-axial sensor value, the Y-axial sensor value, and the Z-axial sensor value.

According to an embodiment of the present invention, when it is determined that seismic motion was generated by the seismic motion sensing unit 120, the seismic motion determiner 130 can perform a concentrative seismic motion sensing step. When it is determined that seismic motion was generated by the seismic motion sensing unit 120, the seismic motion determiner 130 can calculate seismic motion determination parameters using the peak ground acceleration value for previous several seconds from the point in time of determining (sensing) the seismic motion. Further, the seismic motion determiner 130 can determine that the seismic motion sensed in accordance with each value of the seismic motion determination parameters is as the finally generated seismic motion.

In detail, the seismic motion determiner 130 can determine generation of final seismic motion on the basis of whether the seismic motion determination parameters exceed critical determination values set for the seismic motion determination parameters, respectively, for a predetermined time. The predetermined time, for example, may be 3 seconds. Further, the critical determination value may be set for each of the seismic motion sensing result value, the STA, and the LTA that are seismic motion determination parameters. The critical determination value of a seismic motion sensing result value may be the same as the critical sensing value described above, but is not limited thereto and may have a value different from the critical sensing value, depending on embodiments.

Generation of the final seismic motion can be determined on the basis of the number of times that the seismic motion determination parameters exceed the critical determination value within a predetermined time. The seismic motion determination parameters may be calculated three times (a set of ANN, STA, and LTA) within a predetermined time. The predetermined time is previous 3 seconds from the point in time of determining (sensing) seismic motion and the number of times of calculation is an exemplary number of times. For example, the seismic motion determination parameters each may be calculated first between 0 and 2 seconds after seismic motion is sensed, calculated second between 0.5 and 2.5 seconds, and calculated third between 1 and 3 seconds. The calculation may be performed for each of the seismic motion determination parameters.

The seismic motion determiner 130 can determine generation of final seismic motion on the basis of the number of times that the seismic motion determination parameters exceed the critical determination values set for the seismic motion determination parameters, respectively. For example, when a seismic motion sensing result value (ANN result value) exceeds a critical determination value by a predetermined number of times for a predetermined time (3 seconds), the seismic motion determiner 130 can determine generation of final seismic motion. The predetermined number of times may be two times. When a seismic motion sensing result value is continuously calculated and exceeds a critical determination value or exceeds the critical determination value over two times of three-time calculation, the seismic motion determiner 130 can determine generation of final seismic motion. For example, when seismic motion sensing result values calculated first and third of three-time calculation exceed a critical determination value, the seismic motion determiner 130 can determine generation of final seismic motion, and when both of the seismic motion sensing result values calculated first and second or the seismic motion sensing result values calculated second and third exceed the critical determination value, the seismic motion determiner 130 can determine generation of final seismic motion.

Further, when a seismic motion sensing result value exceeds the critical determination value for a predetermined time and the STA and LTA exceed the critical determination value over a predetermined number of times, the seismic motion determiner 130 can determine generation of final seismic motion. When a seismic motion sensing result value exceeds the critical determination value one time and the STA and LTA exceed the critical determination value over a predetermined number of times, for example, over two times while the seismic motion determination parameter is calculated three times for a predetermined time (3 seconds), the seismic motion determiner 130 can determine generation of final seismic motion. Meanwhile, the seismic motion sensing result value does not exceed the critical predetermined value or the STA and LTA do not exceed the critical determination value over a predetermined number of times, calculation of a seismic motion sensing result value by the seismic motion sensing unit 120 may be repeated.

According to the above description, the seismic motion sensor 100 determines whether the peak ground acceleration of the ground due to shaking is shaking over a predetermined level through a seismic motion sensing condition, and when the seismic motion sensing condition is satisfied, the seismic motion sensor 100 can sense seismic motion through shaking by seismic motion by determining whether it is shaking due to seismic motion or shaking that is not seismic motion through an artificial neural network considering the seismic motion characteristic parameters (primary determination). Further, it is possible to determine that seismic motion sensed on the basis of whether critical determination values respectively set for the seismic motion determination parameters are exceeded is seismic motion actually generated (final seismic motion) (secondary determination). That is, the seismic motion sensor 100 can discriminate shaking due to seismic motion and shaking that is not seismic motion by sensing and deciding seismic motion through several steps. Further, the seismic motion sensor 100 can more accurately sense and determine seismic motion without missing a change of shaking by applying a delay time (first delay time) in sensing of seismic motion in preparation for a change of seismic motion or aftershocks.

When the seismic motion determiner 130 determines that seismic motion has been finally generated, the shaking grade calculator 140 can calculate a shaking grade of the final seismic motion. For example, the shaking grade may be understood as the intensity, magnitude, and level of seismic motion. The shaking grade calculator 140 can calculate a shaking grade of the determined final seismic motion through the peak ground acceleration. The shaking grade calculator 140 can determine a shaking grade determination period to which the peak ground acceleration related to the shaking determined as the final seismic motion pertains, and can calculate the shaking grade of the final seismic motion on the basis of the shaking grade determination period. The peak ground acceleration related to the shaking determined as the final seismic motion means the peak ground acceleration that satisfies the seismic motion sensing condition in the seismic motion sensing unit 120.

The shaking grade determination period may be divided into a plurality of periods in accordance with the peak ground acceleration. For example, a period with the peak ground acceleration less than 0.2 may be classified into a first grade (e.g., seismic intensity 4-5), a period with the peak ground acceleration within 0.21 to less than 0.4 may be classified into a second grade (e.g., seismic intensity 6-7), and a period with the peak ground acceleration within 0.41 to less than 0.6 may be classified into a third grade (e.g., seismic intensity 8). The shaking grade calculator 140 can calculate a period, to which the peak ground acceleration pertains, of the classified shaking grade periods, as a shaking grade of the final seismic motion. Further, it is apparent that the shaking grade determination period may be set in various periods other than the first to third grades described above.

The communication unit 150 can notify the shaking grade of the final seismic motion. For example, the communication unit 150 can notify the shaking grade of the final seismic motion to the user terminal 200 or the IOT device 300 through the network. Notification of the shaking grade of the final seismic motion will be described below.

The shaking grade calculator 140 determines the shaking grade of the final seismic motion and can detect a change of the shaking grade of the final seismic motion according to a change of the peak ground acceleration for a predetermined second delay time. The second delay time can be considered for sensing a change of shaking that is generated after calculating the shaking grade of seismic motion. For example, the second delay time may be 7 seconds. When shaking continues even after the shaking grade of the final seismic motion is determined, or when a sensor value including the peak ground acceleration is measured by new shaking, the shaking grade calculator 140 can determine the shaking grade determination period to which the measured peak ground acceleration pertains, and can compare the shaking grade determination period with the previously determined shaking grade of the final seismic motion. When the shaking grade determined by the newly measured peak ground acceleration is a higher grade than the previously determined shaking grade of the final seismic motion, it is possible to notify the change of the shaking grade to the user terminal 200 or the IOT device 300 through the communication unit 150. On the other hand, when the shaking grade determined by the newly measured peak ground acceleration is lower than or the same as the previously determined shaking grade of the final seismic motion, the communication unit 150 can maintain notification of the previously determined shaking grade of the final seismic motion.

The shaking grade calculator 140 can maintain the second delay time until shaking stops and the peak ground acceleration is not measured. For example, when a new sensor value is measured within the second delay time after the shaking grade of the final seismic motion is calculated, the shaking grade calculator 140 can initialize the second delay time and monitor again measurement of a sensor value for the second delay time, and can repeat this process until a sensor value is not measured for the second delay time after a sensor value is finally measured.

When generation of the final seismic motion is generated and it is determined that the final seismic motion has been generated, the seismic motion sensor 100 can determine whether there is a change in shaking grade by additional shaking even after the shaking grade of the determined final seismic motion is calculated and notified, and it is possible to perform reliable seismic motion sensing by repeating this process until shaking completely stops.

The communication unit 150 can notify the shaking grade of the final seismic motion. The communication unit 150 can generate an alarm on the basis of at least any one of the shaking grade of the final seismic motion and the characteristic of the facility where the user terminal 200 or the IOT device 300 is located, and can transmit the generated alarm. The communication unit 150 can generate and provide different earthquake response guideline information on the basis of at least any one of the shaking grade of the final seismic motion and the characteristic of the facility where the user terminal 200 or the IOT device 300 is located. For example, the communication unit 150 can generate and transmit an alarm including different contents in accordance with the shaking grade of the final seismic motion. Further, when the user terminal 200 is located at a shopping facility, the communication unit 150 can generate and transmit an alarm saying that when feeling vibration due to shaking, getting down the body and protecting the head and body using surrounding objects such as belongings, a basket, and a shopping cart in accordance with the places. Further, the communication unit 150 can generate and transmit an alarm including response guidelines for respective positions of the user terminal 200 in the facility. For example, as for on an escalator in a shopping facility, it is possible to generate and transmit an alarm saying that getting down the body not to fall down, holding handles at both sides, and protecting the head with the other hand against objects falling from above. As for at up and down edges of an escalator, it is possible to generate and transmit an alarm saying that getting out of the escalator and protecting the head and body at a safe place. Further, the guidelines of the alarms may be set differently in accordance with the shaking grades of seismic motion.

The communication unit 150 can generate and transmit alarms according to various facilities other than the example (shopping facility) and can set alarms according to detailed environments in facilities. For example, as for a guest room in a lodging facility, it is possible to generate and transmit an alarm saying that getting off a dressing table and windows as far as possible, lying down on the face, and protecting the head and neck; if on a bed, protecting the head and body with a quilt and a pillow; if close to a bed, getting down and protecting the head and body close to the bed; and if close to a door, securing an evacuation passage by opening and fixing the door. Further, as for in a bathroom in a lodging facility, it is possible to generate and transmit an alarm saying that if taking a shower, getting down the body and protecting the head and body with a bucket, a towel, a bathrobe, etc., watching out fragments of tiles and mirrors falling down and broken, turning off the water because cold/hot water may be difficult to control due to a problem with a boiler, and being careful not to fall down by quickly moving due to water on the floor. As described above, the communication unit 150 can generate and transmit different alarms for respective facilities where the user terminal 200 is located, and can generate and transmit different alarms for the positions in the facilities and the environments around the user too.

For example, the communication unit 150 can notify the shaking grade of the final seismic motion to the user terminal 200 or the IOT device 300 through the network. Further, the communication unit 150 can transmit a control signal generated by the control signal generator 160 to the user terminal 200 or the IOT device 300. Further, the communication unit 150 can receive the position information of the user terminal 200 and the IOT device 300 from the user terminal 200 and the IOT device 300. The position information is described below.

The control signal generator 160 can generate a control signal for controlling the user terminal 200 or the IOT device 300 on the basis of at least any one of the calculated shaking grade of the final seismic motion and the characteristic of the facility at which the user terminal 200 or the IOT device 300 is located. The control signal generator 160 can control risk factors of the IOT device 300 due to an earthquake by controlling the IOT device 300 on the basis of at least any one of the shaking grade of the final seismic motion and the characteristic of the facility at which the IOT device 300 is located. The control signal generator 160 can receive the position information of the user terminal 200 from a position sensor (e.g., a GPS sensor) in the user terminal 200 through the communication unit 150. Further, the control signal generator 160 can generate a control signal on the basis of the shaking grade of the final seismic motion and the position information of the user terminal 200 or the characteristic of the facility corresponding to the position information. For example, the characteristic of the facility may include at least any one of the kind and the location of the facility. Further, the control signal generator 160 can receive the position information of the IOT device 300 through the communication unit 150 and can generate a control signal on the basis of the shaking grade of the final seismic motion and the position information of the IOT device 300.

The control signal generator 160 can generate a control signal for controlling the user terminal 200 in accordance with the shaking grade. For example, the control signal generator 160 can generate a control signal such that as the shaking grade increases, the intensity of alarming vibration, the size of texts, and the volume of a sound that are output through the user terminal 200 increase, and can generate a control signal such that different kinds of alarm and different colors of screen of the user terminal 200 are output in accordance with the characteristic of the facility where the user terminal 200 is located.

The user terminal 200 can output different alarms set on the basis of at least any one of the shaking grade of the final seismic motion and the characteristic of the facility where the user terminal 200 is located. Further, the user terminal 200 can find out the current location of the user terminal 200 through a position sensor (e.g., a GPS sensor) in the user terminal 200, and can output an alarm associated with the shaking grade of seismic motion and the current location of the user terminal 200 received from the seismic motion sensor 100. The user terminal 200 can output an alarm on the basis of a control signal including different alarms set for respective facilities and can output an alarm on the basis of a control signal including different alarms set in accordance with the position in facilities or the environments around the user.

An alarm and a control signal according to the shaking grade of the final seismic motion can be transmitted to the IOT device 300 through the communication unit 150. The IOT device 300 can perform an operation on the basis of the control signal. For example, when the IOT device 300 is an artificial intelligence speaker of various IOT devices 300, the artificial intelligence speaker can output different voice messages in accordance with the respective shaking grades and locations when receiving the shaking grade of the final seismic motion and a control signal. The artificial intelligence speaker can output alarms set to include different guidelines in accordance with the location of the artificial intelligence speaker or the location of the user terminal related to the artificial intelligence speaker on the basis of the control signal. Further, when the IOT device is a circuit breaker and the circuit breaker receives the shaking grade of the final seismic motion and a control signal, it is possible to cut the power that is supplied to electronic devices connected to the circuit breaker, and can cut the power for different electronic devices, depending on the shaking grades of seismic motion. For example, assuming that a refrigerator, a microwave oven, and an electric rice cooker are connected to a circuit breaker, it is possible to power off the microwave oven when the shaking grade is the first grade, power off the power of the electric rice cooker when the shaking grade is the second grade, and power off the power of all of the electronic devices including the refrigerator when the shaking grade is the third grade. As described above, the seismic motion sensor 100 provides control signals set in accordance with the shaking grades, the IOT device 300 can perform optimal responses in accordance with the shaking grades.

Figure 6:
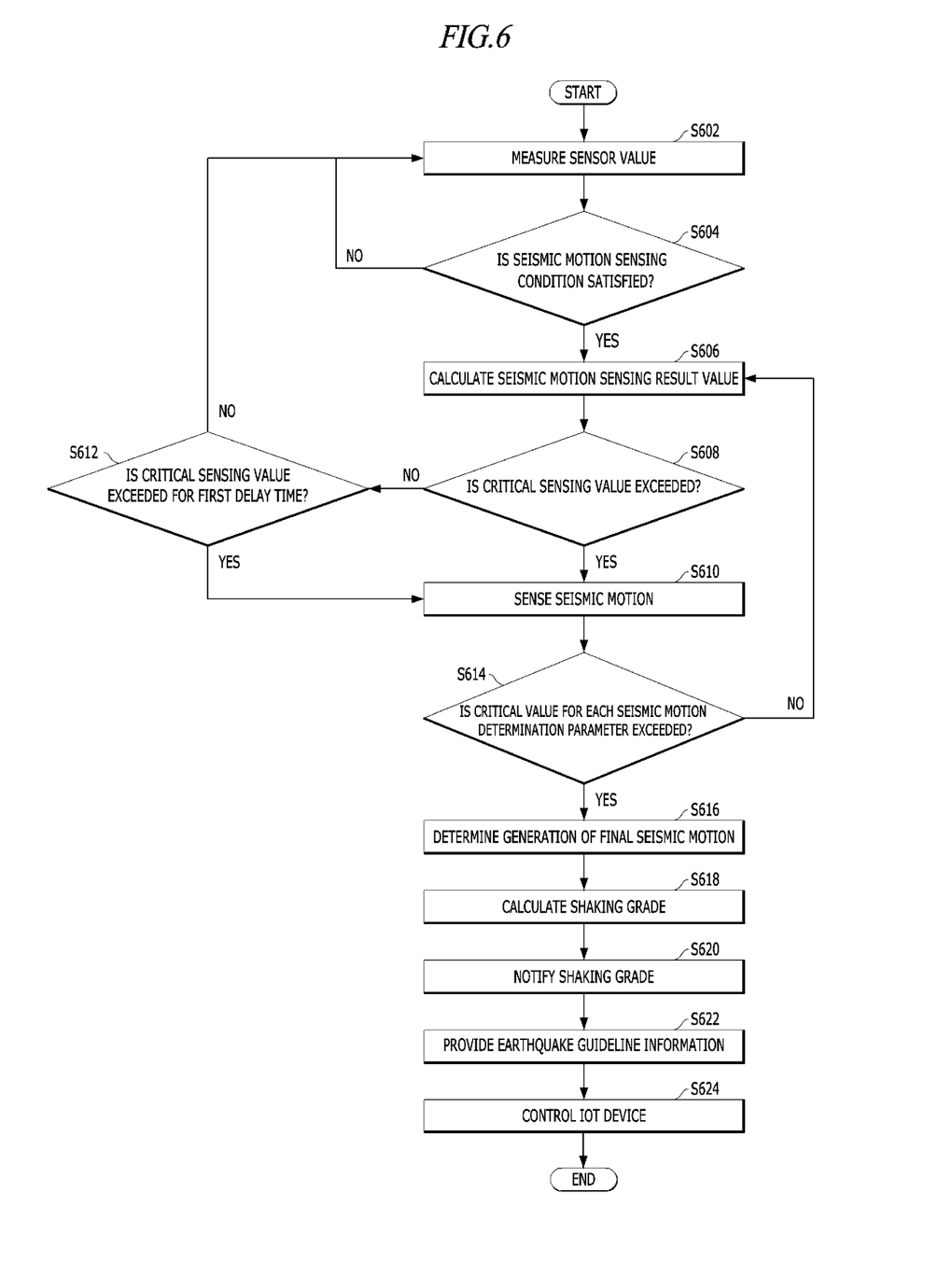
FIG. 6 is a diagram showing the flow of a method of sensing seismic motion using a seismic motion sensor according to an embodiment of the present invention.

FIG. 6 is a diagram showing the flow of a method of sensing seismic motion using a seismic motion sensor according to an embodiment of the present invention.

The method of sensing seismic motion using a seismic motion sensor shown in FIG. 6 may be performed by the seismic motion sensor described above with reference to FIGS. 1 to 5. Accordingly, if not described below, the description about the seismic motion sensor referring to FIGS. 1 to 5 can be applied in the same way to FIG. 6.

Referring to FIG. 6, in step S602, the sensor unit 110 can measure a sensor value including peak ground acceleration (PGA) of the ground due to shaking. The sensor value may include an X-axial sensor value, a Y-axial sensor value, and a Z-axial sensor value.

In step S604, the seismic motion sensing unit 120 can determine whether the peak ground acceleration satisfies a seismic motion sensing condition. The seismic motion sensing condition may determine whether the peak ground acceleration exceeds predetermined critical acceleration. Further, the predetermined critical acceleration, for example, may be 0.2, but is not limited thereto and may be automatically set as a value between 0.1 and 0.2 on the basis of noise information in accordance with the operation environment of the seismic motion sensor 100. When the peak ground acceleration does not satisfy the seismic motion sensing condition, the sensor unit 110 can repeatedly measure sensor values.

In step S606, when the peak ground acceleration satisfies the seismic motion sensing condition, the seismic motion sensing unit 120 can calculate a seismic motion sensing result value from an artificial neural network (ANN) that uses the peak ground acceleration as input. The artificial neural network can be constructed through learning that uses the peak ground acceleration as input and discriminates shaking due to seismic motion and shaking when it is not seismic motion on the basis of the peak ground acceleration. In step S606, the seismic motion sensing unit 120 can calculate the seismic motion characteristic parameters and calculate a seismic motion sensing result in consideration of the calculated seismic motion characteristic parameters to calculate a more reliable result through the artificial neural network. The seismic motion characteristic parameters may include at least one of a ZC (Zero Cross), an IQR (Interquartile range), and a CAV (Cumulative Absolute Velocity).

In step S608, the seismic motion sensing unit 120 can determine whether the seismic motion sensing result value exceeds a predetermined critical sensing value. For example, the critical sensing value may be 0.9. When a seismic motion sensing result value exceeds a predetermined critical sensing value, in step S610, the seismic motion sensing unit 120 can sense that seismic motion was generated by the shaking. In other words, it is possible to discriminate shaking due to factors other than seismic motion and shaking due to seismic motion from a seismic motion sensing result value, and when the seismic motion sensing result value exceeds a predetermined critical sensing value, it is possible to sense that seismic motion was generated.

Meanwhile, in step S608, when the seismic motion sensing result value does not exceed the predetermined critical sensing value, the seismic motion sensing unit 120, in step S612, can determine whether the seismic motion sensing result value exceeds the predetermined critical sensing value for a predetermined first delay time. For example, the first delay time may be 10 seconds. The seismic motion sensing unit 120 can determine whether a seismic motion sensing result value exceeds the critical sensing value due to a change of shaking (e.g., when the intensity of shaking increases) for the first delay time in consideration of the change of shaking even if the seismic motion sensing result value initially calculated after the shaking is generated does not exceed the critical sensing value. The seismic motion sensing unit 120 can prevent omission of sensing of seismic motion by considering a change of shaking for the first delay time.

When seismic motion is sensed by the seismic motion sensing unit 120, in step S614, the seismic motion determiner 130 can determine whether critical determination values set for respectively seismic motion determination parameters are exceeded for a predetermined time. The seismic motion determination parameters may include at least any one of a seismic motion sensing result value, an STA (Short Term Average), and an LTA (Long Term Average). The predetermined time, for example, may be 3 seconds. Further, the critical determination value may be set for each of the seismic motion sensing result value, the STA, and the LTA that are seismic motion determination parameters. The critical determination value of a seismic motion sensing result value may be the same as the critical sensing value described above, but is not limited thereto and may have a value different from the critical sensing value, depending on embodiments.

Generation of the final seismic motion can be determined on the basis of the number of times that the seismic motion determination parameters exceed the critical determination value within a predetermined time. The seismic motion determination parameters can be calculated three times within a predetermined time. The predetermined time is 3 seconds and the number of calculation times is an exemplary number of times. For example, the seismic motion determination parameters each may be calculated first between 0 and 2 seconds after seismic motion is sensed, calculated second between 0.5 and 2.5 seconds, and calculated third between 1 and 3 seconds. The calculation may be performed for each of the seismic motion determination parameters.

In step S616, the seismic motion determiner 130 can determine generation of final seismic motion on the basis of the number of times that the seismic motion determination parameters exceed the critical determination values set for the seismic motion determination parameters, respectively. For example, when a seismic motion sensing result value exceeds a critical determination value by a predetermined number of times for a predetermined time (3 seconds), the seismic motion determiner 130 can determine generation of final seismic motion. The predetermined number of times may be two times. When a seismic motion sensing result value is continuously calculated and exceeds a critical determination value or exceeds the critical determination value over two times of three-time calculation, the seismic motion determiner 130 can determine generation of final seismic motion. For example, when seismic motion sensing result values calculated first and third of three-time calculation exceed a critical determination value, the seismic motion determiner 130 can determine generation of final seismic motion, and when both of the seismic motion sensing result values calculated first and second or the seismic motion sensing result values calculated second and third exceed the critical determination value, the seismic motion determiner 130 can determine generation of final seismic motion. Further, when a seismic motion sensing result value exceeds the critical determination value for a predetermined time and the STA and LTA exceed the critical determination value over a predetermined number of times, the seismic motion determiner 130 can determine generation of final seismic motion. When a seismic motion sensing result value exceeds the critical determination value one time and the STA and LTA exceed the critical determination value over a predetermined number of times, for example, over two times while the seismic motion determination parameter is calculated three times for a predetermined time (3 seconds), the seismic motion determiner 130 can determine generation of final seismic motion.

When it is determined that the final seismic motion was generated in step S616, the shaking grade calculator 140 can calculate the shaking grade of the seismic motion in step S618. The shaking grade calculator 140 can calculate a shaking grade of the determined final seismic motion through the peak ground acceleration. The shaking grade calculator 140 can calculate the shaking grade of the final seismic motion on the basis of a shaking grade determination period to which the peak ground acceleration related to the shaking determined as the final seismic motion pertains. The peak ground acceleration related to the shaking determined as the final seismic motion means the peak ground acceleration that satisfies the seismic motion sensing condition in the above-described seismic motion sensing unit 120.

In step S620, the communication unit 150 can notify the shaking grade of the final seismic motion. For example, the communication unit 150 can notify the shaking grade of the final seismic motion to the user terminal 200 or the IOT device 300 through the network. The communication unit 150 can set different alarms and notify shaking grades on the basis of at least any one of the shaking grade of the final seismic motion and the characteristic of the facility where the user terminal 200 is located.

In step S618, the shaking grade calculator 140 determines the shaking grade of the final seismic motion and then can detect a change of the shaking grade of the final seismic motion according to a change of the peak ground acceleration for a predetermined second delay time. The second delay time can be considered for sensing a change of shaking that is generated after calculating the shaking grade of seismic motion. For example, the second delay time may be 7 seconds. When shaking continues even after the shaking grade of the final seismic motion is determined, or when a sensor value including the peak ground acceleration is measured by new shaking, the shaking grade calculator 140 can determine the shaking grade determination period to which the measured peak ground acceleration pertains, and can compare the shaking grade determination period with the previously determined shaking grade of the final seismic motion. As a comparison result, when the shaking grade determined by the newly measured peak ground acceleration is a higher grade than the previously determined shaking grade of the final seismic motion, it is possible to notify the change of the shaking grade to the user terminal 200 or the IOT device 300 through the communication unit 150. On the other hand, when the shaking grade determined by the newly measured peak ground acceleration is lower than or the same as the previously determined shaking grade of the final seismic motion, the communication unit 150 can maintain notification of the previously determined shaking grade of the final seismic motion.

The shaking grade calculator 140 can maintain the second delay time until shaking stops and the peak ground acceleration is not measured in step S618. For example, when a new sensor value is measured within the second delay time after the shaking grade of the final seismic motion is calculated, the shaking grade calculator 140 can initialize the second delay time and monitor again measurement of a sensor value for the second delay time, and can repeat this process until a sensor value is not measured for the second delay time after a sensor value is finally sensed.

In step S622, the communication unit 150 can generate and provide different earthquake response guideline information on the basis of at least any one of the shaking grade of the final seismic motion and the characteristic of the facility where the user terminal 200 or the IOT device 300 is located. For example, the current location of the user terminal 200 can be found out through a position sensor (e.g., a GPS sensor) in the user terminal 200 and the communication unit 150 can generate and provide different earthquake response guideline information in consideration of the location of the user terminal.

The communication unit 150 can generate and transmit an alarm including different contents in accordance with the shaking grade of the final seismic motion. Further, the communication unit 150 can generate and transmit alarms according to various facilities and can set alarms according to detailed environments in facilities. Further, the communication unit 150 can generate and transmit different alarms for respective facilities where the user terminal 200 is located, and can generate and transmit different alarms for the positions in the facilities and the environments around the user too.

In step S624, the communication unit 150 notifies the shaking grade of the final seismic motion to the IOT device 300 through a network, whereby the IOT device 300 can be controlled. Further, the control signal generator 160 can generate a control signal for controlling the user terminal 200 and the IOT device 300 on the basis of at least any one of the calculated shaking grade of the final seismic motion and the characteristic of the facility at which the user terminal 200 or the IOT device 300 is located, and the communication unit 150 can transmit the control signal to the IOT device 300. The control signal generator 160 can control risk factors of the IOT device 300 due to an earthquake by controlling the IOT device 300 on the basis of at least any one of the shaking grade of the final seismic motion and the characteristic of the facility at which the IOT device 300 is located. The IOT device 300 can perform an operation on the basis of the control signal. For example, when the IOT device 300 is an artificial intelligence speaker of various IOT devices 300, the artificial intelligence speaker can output different voice messages in accordance with the respective shaking grades and locations when receiving the shaking grade of the final seismic motion and a control signal. The artificial intelligence speaker can output alarms set to include different guidelines in accordance with the location of the artificial intelligence speaker or the location of the user terminal related to the artificial intelligence speaker on the basis of the control signal. Further, when the IOT device is a circuit breaker and the circuit breaker receives the shaking grade of the final seismic motion and a control signal, it is possible to cut the power that is supplied to electronic devices connected to the circuit breaker, and can cut the power for different electronic devices, depending on the shaking grades of seismic motion. For example, assuming that a refrigerator, a microwave oven, and an electric rice cooker are connected to a circuit breaker, it is possible to power off the microwave oven when the shaking grade is the first grade, power off the power of the electric rice cooker when the shaking grade is the second grade, and power off the power of all of the electronic devices including the refrigerator when the shaking grade is the third grade. As described above, the seismic motion sensor 100 provides control signals set in accordance with the shaking grades, the IOT device 300 can perform optimal responses in accordance with the shaking grades.

Step S622 and step S624 may be independently performed and may be simultaneously performed, but the present invention is not limited thereto.

The method of sensing seismic motion using a seismic motion sensor according to an embodiment of the present invention may be implemented and recorded on a computer-readable medium in a program command type that can be executed through various computer devices. The computer-readable media may include program commands, data files, and data structures individually or in combinations thereof. The program commands that are recorded on the media may be those specifically designed and configured for the present invention or may be those available and known to those engaged in computer software in the art. The computer-readable recording media include magnetic media such as hard disks, floppy disks, and a magnetic tape, optical media such as CD-ROMs and DVDs, magneto-optical media such as floptical disks, and hardware devices specifically configured to store and execute program commands, such as ROM, RAM, and flash memory. The program commands include not only machine language codes compiled by a compiler, but also high-level language codes that can be executed by a computer using an interpreter, etc. The hardware device may be configured to operate as one or more software modules to perform the operation of the present disclosure, and vice versa.

The above description is provided as an exemplary embodiment of the present disclosure and it should be understood that the present disclosure may be easily modified in other various ways without changing the spirit or the necessary features of the present disclosure by those skilled in the art. Therefore, the embodiments described above are only examples and should not be construed as being limitative in all respects. For example, the components described as single parts may be divided and the components described as separate parts may be integrated.

The scope of the present disclosure is defined by the following claims rather than the detailed description, and all of changes and modifications obtained from the meaning and range of claims and equivalent concepts should be construed as being included in the scope of the present disclosure.

The invention claimed is:

1. A method of sensing seismic motion using a seismic motion sensor, the method comprising:
   measuring a sensor value including a peak ground acceleration (PGA) of a ground due to shaking from the seismic motion sensor;
   by the seismic motion sensor, sensing a seismic motion on the basis of a seismic motion sensing result value calculated from an artificial neural network that uses the peak ground acceleration as input when the peak ground acceleration satisfies a seismic motion sensing condition;
   by the seismic motion sensor, determining generation of a final seismic motion on the basis of a seismic motion determination parameter calculated from the sensor value on the basis of the seismic motion sensing result value;
   by the seismic motion sensor, calculating a shaking grade of the final seismic motion through the peak ground acceleration; and
   by the seismic motion sensor, notifying the shaking grade of the final seismic motion,
   wherein the sensing of seismic motion calculates the seismic motion sensing result value from the artificial neural network in consideration of a seismic motion characteristic parameter, and determines whether the seismic motion sensing result value exceeds a predetermined critical sensing value, and senses shaking when the seismic motion sensing result value exceeds the predetermined critical sensing value as seismic motion, and
   wherein if the seismic motion sensing result value initially calculated after the shaking is generated does not exceed the predetermined critical sensing value, the sensing of seismic motion continuously updates the seismic motion sensing result value due to a change of shaking in consideration of the change of shaking and determines whether the seismic motion sensing result value due to the change of shaking exceeds the predetermined critical sensing value for a predetermined first delay time, and wherein the seismic motion characteristic parameter includes one of a ZC (Zero Cross), an IQR (Interquartile range), and a CAV (Cumulative Absolute Velocity).

2. The method of claim 1, wherein the sensor value includes an X-axial sensor value, a Y-axial sensor value, and a Z-axial sensor value, wherein X, Y, and Z axes are orthogonal to each other, and the seismic motion sensing condition determines whether the peak ground acceleration exceeds a predetermined critical acceleration.

3. The method of claim 1, wherein when the seismic motion sensing result value exceeds the predetermined critical sensing value and seismic motion is sensed, the determining of generation of final seismic motion determines generation of final seismic motion on the basis of whether the seismic motion determination parameter exceeds a critical determination value set for the seismic motion determination parameter for a predetermined time, and the seismic motion determination parameter includes one of the seismic motion sensing result value, an STA (Short Term Average), and an LTA (Long Term Average).

4. The method of claim 3, wherein the determining of generation of final seismic motion determines generation of the final seismic motion when the seismic motion sensing result value exceeds the critical determination value by a predetermined number of times for the predetermined time, or determines generation of the final seismic motion when the seismic motion sensing result value exceeds the critical determination value for the predetermined time and the STA and the LTA exceed the critical determination value over the predetermined number of times.

5. The method of claim 3, wherein the calculating of a shaking grade of the final seismic motion calculates the shaking grade of the final seismic motion on the basis of a shaking grade determination period to which peak ground acceleration associated with shaking determined as the final seismic motion pertains, and detects a change of the shaking grade of the final seismic motion according to a change of the peak ground acceleration for a predetermined second delay time.

6. The method of claim 3, wherein the notifying of the shaking grade of the final seismic motion sets different alarms on the basis of at least any one of the calculated shaking grade of the final seismic motion and a characteristic of a facility where a user terminal is located.

7. A seismic motion sensor comprising:
a sensor unit configured to measure a sensor value including a peak ground acceleration (PGA) of a ground due to shaking;
a seismic motion unit sensing configured to sense a seismic motion on the basis of a seismic motion sensing result value calculated from an artificial neural network that uses the peak ground acceleration as input when the peak ground acceleration satisfies a seismic motion sensing condition;
a seismic motion determiner configured to determine generation of a final seismic motion on the basis of a seismic motion determination parameter calculated from the sensor value on the basis of the seismic motion sensing result value;
a shaking grade calculator configured to calculate a shaking grade of the final seismic motion through the peak ground acceleration; and
a communication unit configured to notify the shaking grade of the final seismic motion, wherein the seismic motion sensing unit calculates the seismic motion sensing result value from the artificial neural network in consideration of a seismic motion characteristic parameter, and determines whether the seismic motion sensing result value exceeds a predetermined critical sensing value, and senses shaking when the seismic motion sensing result value exceeds the predetermined critical sensing value as seismic motion, and wherein if the seismic motion sensing result value initially calculated after the shaking is generated does not exceed the predetermined critical sensing value, the sensing of seismic motion continuously updates the seismic motion sensing result value due to a change of shaking in consideration of the change of shaking and determines whether the seismic motion sensing result value due to the change of shaking exceeds the predetermined critical sensing value for a predetermined first delay time, and wherein the seismic motion characteristic parameter includes one of a ZC (Zero Cross), an IQR (Interquartile range), and a CAV (Cumulative Absolute Velocity).

8. An earthquake response system comprising:
a seismic motion sensor configured to measure a sensor value including a peak ground acceleration (PGA) of a ground due to shaking, sense a seismic motion on the basis of a seismic motion sensing result value calculated from an artificial neural network that uses the peak ground acceleration as input when the peak ground acceleration satisfies a first seismic motion sensing condition, determine generation of a final seismic motion on the basis of a seismic motion determination parameter calculated from the sensor value on the basis of the seismic motion sensing result value, calculate a shaking grade of the final seismic motion through the peak ground acceleration, and notify the shaking grade of the final seismic motion; and
a user terminal configured to output an alarm on the basis of the calculated shaking grade of the final seismic motion, wherein the seismic motion sensor calculates the seismic motion sensing result value from the artificial neural network in consideration of a seismic motion characteristic parameter, and determines whether the seismic motion sensing result value exceeds a predetermined critical sensing value, and senses shaking when the seismic motion sensing result value exceeds the predetermined critical sensing value as seismic motion, and wherein if the seismic motion sensing result value initially calculated after the shaking is generated does not exceed the predetermined critical sensing value, the sensing of seismic motion continuously updates the seismic motion sensing result value due to a change of shaking in consideration of the change of shaking and determines whether the seismic motion sensing result value due to the change of shaking exceeds the predetermined critical sensing value for a predetermined first delay time, and wherein the seismic motion characteristic parameter includes one of a ZC (Zero Cross), an IQR (Interquartile range), and a CAV (Cumulative Absolute Velocity).

* * * * *